US007516477B2

(12) United States Patent
Corby et al.

(10) Patent No.: US 7,516,477 B2
(45) Date of Patent: Apr. 7, 2009

(54) METHOD AND SYSTEM FOR ENSURING THAT COMPUTER PROGRAMS ARE TRUSTWORTHY

(75) Inventors: Karen E. Corby, Seattle, WA (US); Aaron Goldfeder, Seattle, WA (US); John M. Hawkins, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 10/971,499

(22) Filed: Oct. 21, 2004

(65) Prior Publication Data

US 2006/0090192 A1    Apr. 27, 2006

(51) Int. Cl.
    H04L 9/00    (2006.01)
(52) U.S. Cl. .......................................... 726/1; 726/26
(58) Field of Classification Search ............... 726/1, 726/26; 713/187; 707/9; 715/749, 867; 717/174
    See application file for complete search history.

(56) References Cited

U.S. PATENT DOCUMENTS

| | | | |
|---|---|---|---|
| 6,694,434 B1* | 2/2004 | McGee et al. ............... | 713/189 |
| 7,206,828 B1* | 4/2007 | Bourke-Dunphy et al. .. | 709/221 |
| 7,281,245 B2* | 10/2007 | Reynar et al. ................ | 717/173 |
| 2002/0087966 A1* | 7/2002 | Wiginton et al. ............ | 717/174 |
| 2004/0255291 A1* | 12/2004 | Sierer et al. .................. | 717/174 |
| 2005/0120242 A1* | 6/2005 | Mayer et al. ................ | 713/201 |
| 2005/0278790 A1* | 12/2005 | Birk et al. ...................... | 726/26 |
| 2006/0031941 A1* | 2/2006 | Xiao et al. ..................... | 726/27 |
| 2006/0195802 A1* | 8/2006 | Nakayama ................... | 715/867 |

* cited by examiner

*Primary Examiner*—Minh Dieu Nguyen
(74) *Attorney, Agent, or Firm*—Workman Nydegger (57) ABSTRACT

Described is a system and method by which an application program is evaluated for trustworthiness based on the permissions and/or privileges it requests relative to a program category. The program describes the permissions needed to operate, and identifies itself as belonging to a particular category. Security components compare the requested permission set against the permissions that programs of that category actually need in order to operate properly. Programs requesting more permissions than needed are deemed untrustworthy. For example, screen saver application programs need only a limited permission set to operate properly, including full screen access and the ability to read files, but do not need network access permissions or write access to files. Any screensaver application that requests only the needed permission set is deemed trustworthy, while others that request permissions beyond what is actually needed are not deemed trustworthy, and a user or automated policy process may then intervene.

20 Claims, 5 Drawing Sheets

METHOD AND SYSTEM FOR ENSURING THAT COMPUTER PROGRAMS ARE TRUSTWORTHY

FIELD OF THE INVENTION

The invention relates generally to computer program, and more particularly to avoiding the installation of computer programs that may be dangerous.

BACKGROUND

Many computer programs and component parts used by programs are available over the Internet from a vast number of sources. Although much of this code is harmless, many computer users will not even consider downloading such programs for fear of putting potentially malicious code onto their machines, and/or making their machine unstable. As such, users will not download executable code from any site other than a known, trusted source, which are typically large companies with well established reputations. Other users are who are less knowledgeable will install anything on their computers and then run into problems.

Even code that appears harmless can actually be malicious. By way of example, screen savers are application programs that display moving and/or alternating images when the computer system is otherwise idle, in order to keep the monitor display screen from being damaged by displaying the same output for too long. As a result, screen savers need to take up the full screen, whereby the user has no indication that client code is being run. However, because screen savers are full screen application programs, they are able to spoof security log-on screens and thereby obtain a user's credentials, which may then be transmitted to a criminal entity. Similarly, a user may be tricked into inputting other personal data, which may then be used without consent. If the program is not able to transmit the data, because for example there is not presently a network connection, a screen saver can store a stolen identity and password in an isolated storage area, where the screen saver or another program can later locate that data and transmit it when there is a connection.

Further, application programs are executable code, and thus are able to perform other dangerous behaviors, such as writing to the registry, reading personal information from a hard disk, and so forth. In general, careful computer users simply do not download executable code from an untrusted source, even though they may want and/or benefit from such code, because the risks to security, privacy and/or stability are too great.

What is needed is a way to ensure the trustworthiness of executable code downloaded from any source. When not deemed trustworthy, additional policy may then be followed as to how such code should be handled.

SUMMARY OF THE INVENTION

Briefly, the present invention is directed towards a system and method by which an application program describes the permissions that it needs to operate, as well as tagging itself as a particular category of application program. Security components then compare the requested set of one or more permissions against the permissions that the particular category of application program actually needs in order to operate properly. Those programs that ask for more permissions than are needed are deemed not trustworthy.

By way of example, a screen saver application program will need a limited set of permissions including full screen access, as well as the ability to read images from local storage. However, to operate properly, a screensaver does not need network access permissions, or write access to files. In order to do damage and/or steal a user's data, a malicious screen saver would need to be able to write to storage and/or transmit information over a network. Thus, any screensaver application that requests only the needed permission set is deemed trustworthy, while any screensaver that requests permissions and/or privileges beyond what is actually needed is not deemed trustworthy and a user or automated policy process may then intervene.

In one implementation, a user identifies application program code such as by clicking on a link that downloads an executable file for installation. To be considered trustworthy, a data structure (e.g., text file) referred to as a manifest that describes the application program code to the computer system needs to be associated with the application program code. The application also needs to have a category tag that identifies what category of program it is, e.g., a screensaver, a spellchecker, or some other type of application program.

The information specified in the manifest includes a requested permission set that is evaluated against a basic safe permission set previously established for that category of application program. In order to be considered trustworthy, the application program's set needs to correspond to the established set, (e.g., match it or be a subset of the established permission set). If trustworthy, a trust manager will apply one policy, otherwise the trust manager will apply another with respect to installing the application program. Note that the policy may warn the user that the application program is not considered trustworthy, but still allow the user to install the application program if desired.

In an alternative implementation, an application program that declares a category is automatically assigned a set of pre-established security-related information for that category. By way of example, using the screen saver as the application program, a program may designate itself as a screen saver, and, regardless of what permissions and/or privileges it requests, (if any), the basic safe full screen permission set will be given to the program but no other permission or privilege. Note that in such an implementation, a program is bound by its specified category, and thus a category such as "expanded screen saver" or the like may be required for screen saver application programs that need other permissions/privileges, in which case they will also specify their needed permissions and privileges and may be (subject to policy) installed as a screensaver, but not one that is deemed trustworthy.

A screen saver application program may be created as trustworthy by declaring its capabilities (e.g., category equals screensaver) and requesting only the basic safe full screen permission set in the application manifest, which may comprise an XML file constructed via a XAML authoring tool. Numerous other categories of programs may benefit from a trustworthy status that results from their requesting only a previously-established safe permission set relative to their functionality. For example, spell checkers, media players and so forth may be deemed trustworthy.

Other advantages will become apparent from the following detailed description when taken in conjunction with the drawings, in which:

DETAILED DESCRIPTION

Exemplary Operating Environment

Figure 1:
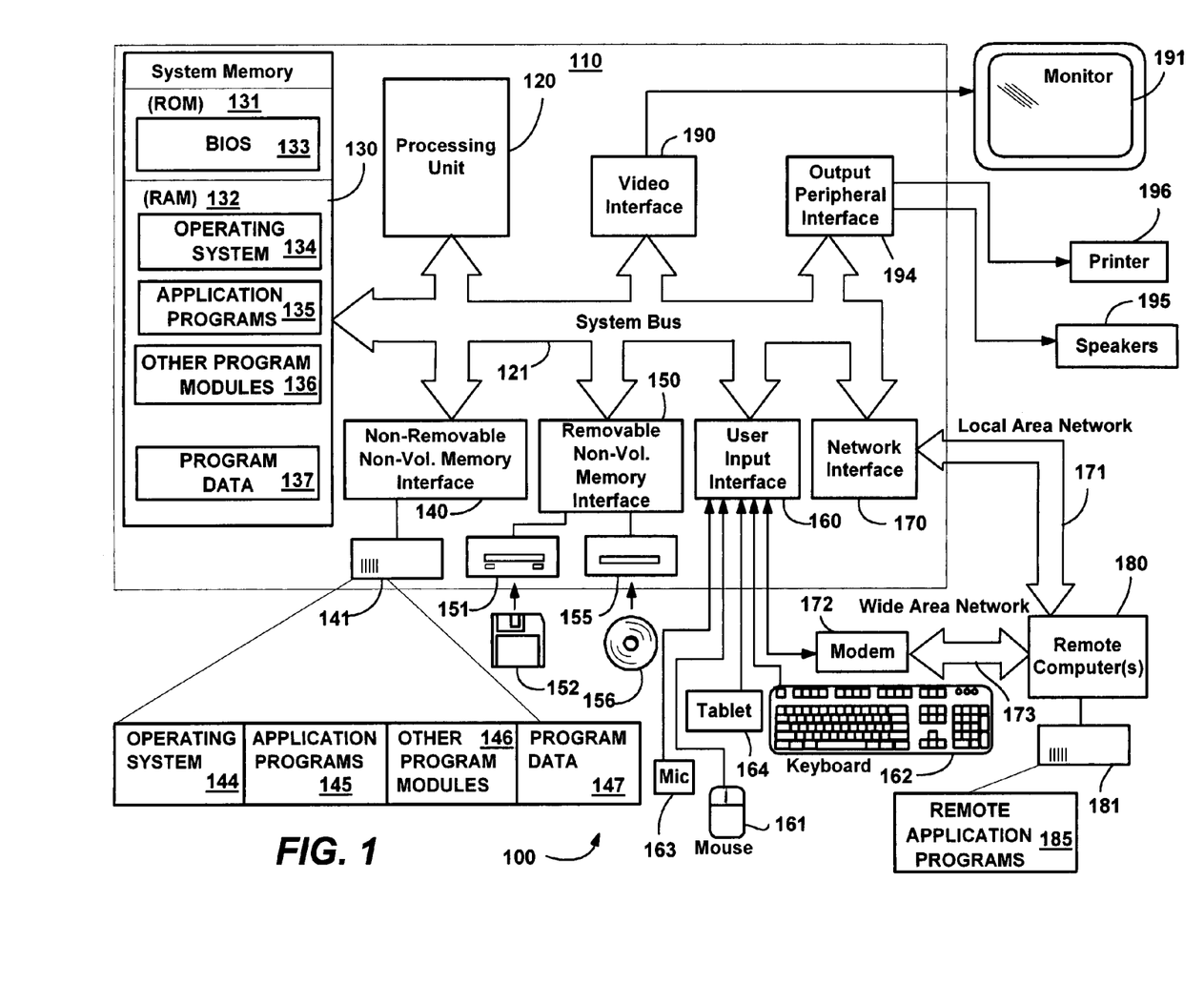
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Ensuring that Computer Programs are Trustworthy

The present invention is generally directed towards a system and method by which application programs operate in an environment in which they need to specify which permissions and/or privileges they need in order to operate. Those that do not specify them will not receive them. In order to be considered as a trusted application program, the application program also needs to specify a category to which the application program belongs. In general, and as will be described below, to be considered trustworthy, application programs cannot request permissions and/or privileges beyond what has been established (e.g., by a trusted entity) as being necessary and safe for that category. As will be understood, numerous ways to implement the present invention are feasible, and only some of the alternatives are described herein. For example, the permissions and/or privileges that an application program gets may be automatically assigned to the application program based on the category that is specified.

Moreover, the present invention is described below with reference to a screen saver example in which an application program that declares itself as being of a screen saver category is only considered trustworthy if its security-related information only requests a limited data set, e.g., containing permission to execute (SecurityPermision with Execution flag) and to write to the full screen but not other permissions such as file write permissions, network access permissions and so forth. As such, the present invention is not limited to any particular examples used herein, but rather may be used various ways that provide benefits and advantages in computing in general.

Figure 2:
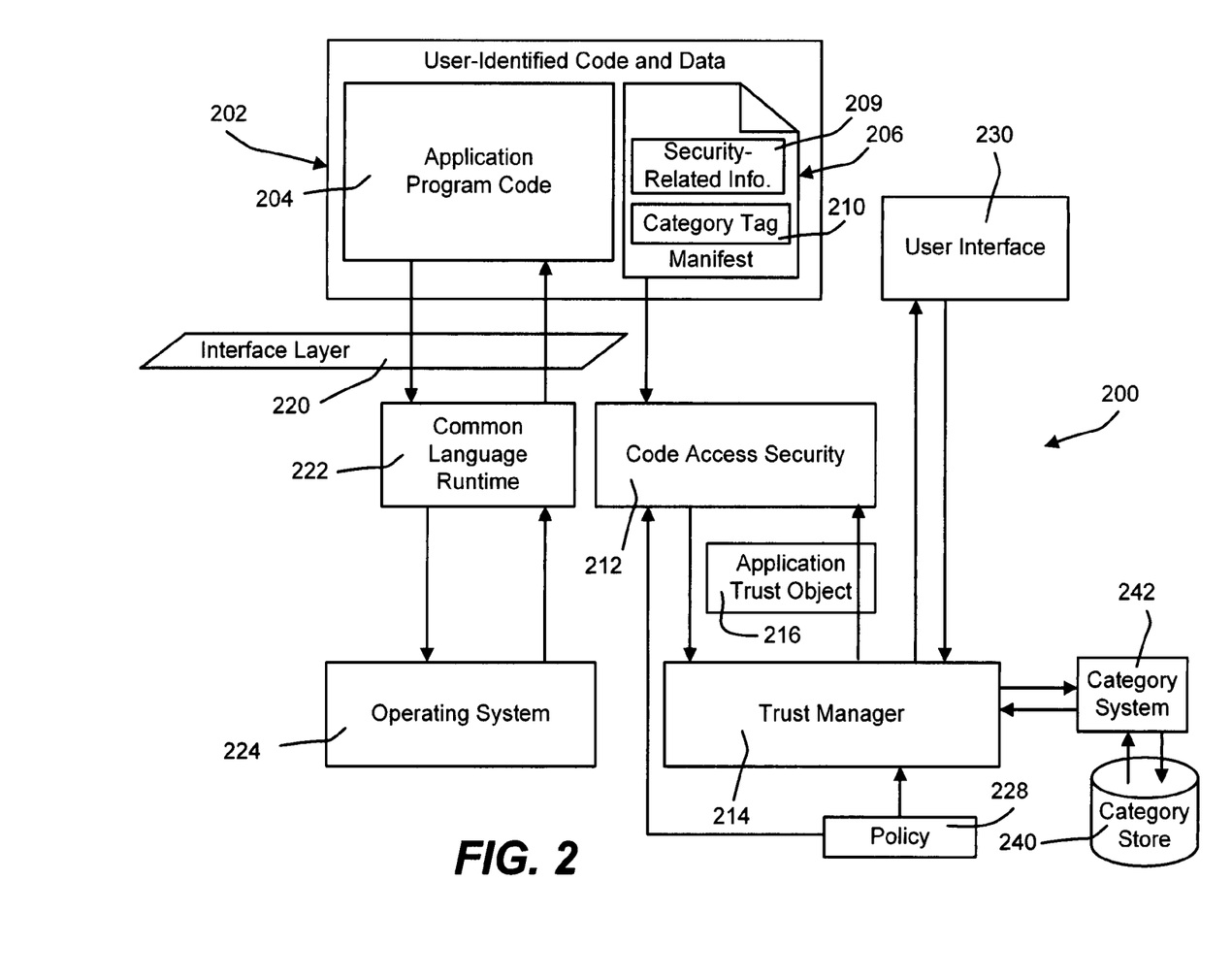
FIG. 2 is a block diagram generally representing an example architecture into which programs may be evaluated for trustworthiness in accordance with various aspects of the present invention.
Figure 3:
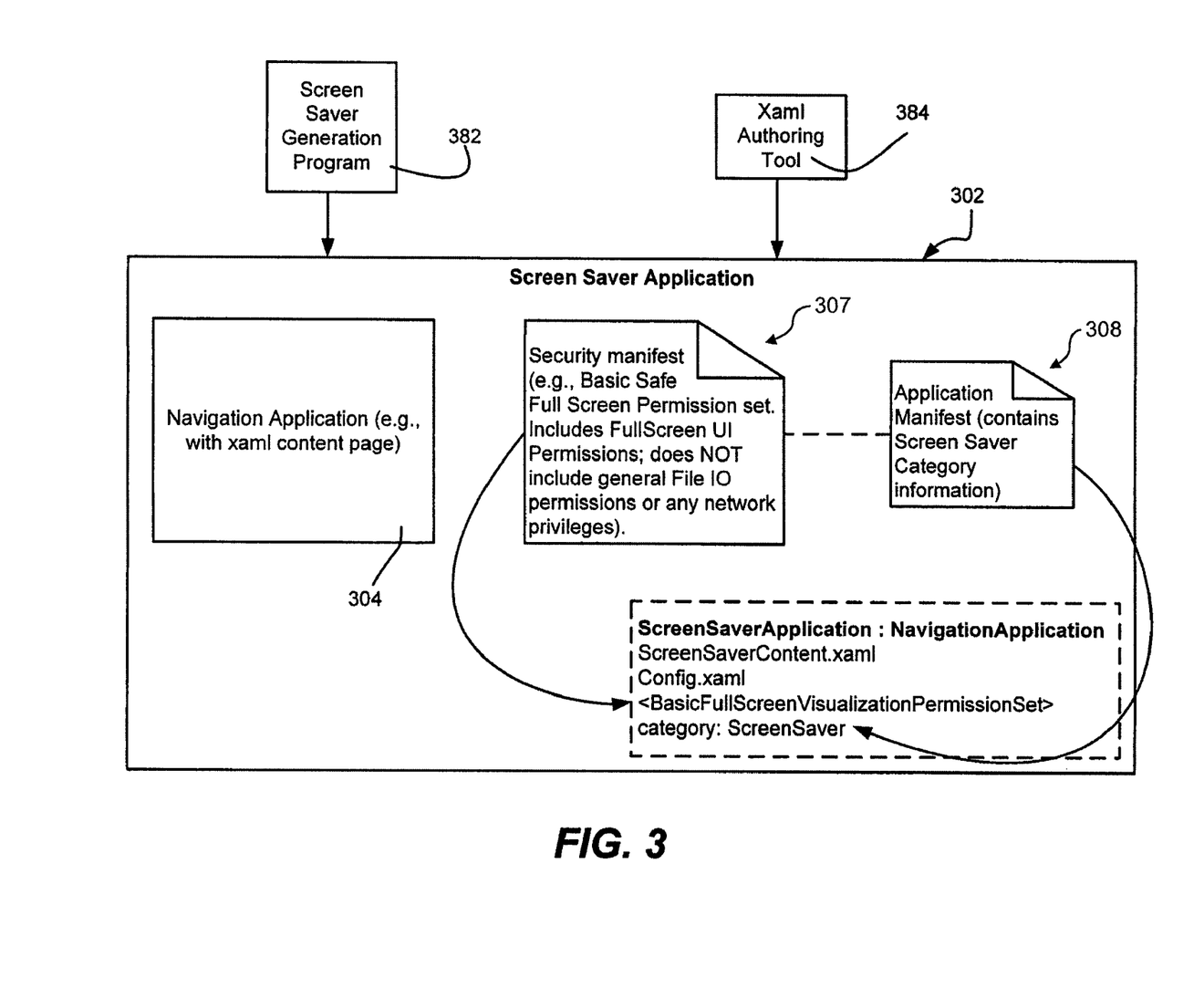
FIG. 3 is a block diagram generally representing the construction of a trustworthy screensaver, in accordance with various aspects of the present invention.

FIG. 2 shows an example of an architecture 200 that grants and enforces permissions. In general, a user identifies application program code 202, such as by clicking on a link that downloads an executable file for installation. To be considered trustworthy, certain information needs to be associated with the application program code 204, namely metadata that describes the application program code 204 to the computer system and essentially acts as a contract that specifies what the application program 202 will do. In the example of FIG. 2, the metadata is contained in a data structure (e.g., text file) referred to as a manifest 206, which as described below, contains security-related information 209 and category related information in the form of a tag 210. Notwithstanding the example of FIG. 2, it is understood that there may be considered more than one such manifest; for example, as represented in FIG. 3, a security manifest 307 and an application manifest 308 that contains the category-related information are shown, which may be different sections of the same file, or different files. A deployment manifest may encapsulate one or more application manifests and allows applications to carry other applications or components ("add-ins") for their own use, and to make the capabilities provided by these applications visible just within the scope of that deployment.

The information specified in the manifest 206 is provided to a code access security component 212, which in turn provides the manifest to a trust manager 214 for evaluation. In general, the trust manager 214 constructs an application trust object 216 based on the manifest 206 that is then associated with the executable code, as well as (typically) based on policy data 228 and/or user input via a user interface 230. In order to do something that requires a permission (beyond a default set), the manifest 206 needs to specify the permission among the security-related information 209. Otherwise, when the program code 204 later calls an API (shown as interface layer 220) to perform some action via the common language runtime (CLR) 222 and operating system 224, the code access security component 212 will block the action because the application trust object 216 tells the runtime the security policy to enforce, and the runtime does not allow the code 204 to do the action. Note that there may be a default permission set applied to application programs regardless of their location or zone of origin; this set is deemed safe, and is sometimes referred to as a secure execution environment. For example, a screen saver may be given file dialog permission, execution permission, and own clipboard UI permission by default. To set a window to full screen, the program sets a WindowState property to FullScreen by a set method for this property that includes a demand:
(new UIPermission(UIPermissionWindow.UnrestrictedFulScreen, * UIPermissionClipboard.OwnClipboard).)demand( )

Further, note that in this exemplified environment, individual blocks of code (corresponding to the same application) may have different associated permission sets (containing one or more permissions).

Figure 4:
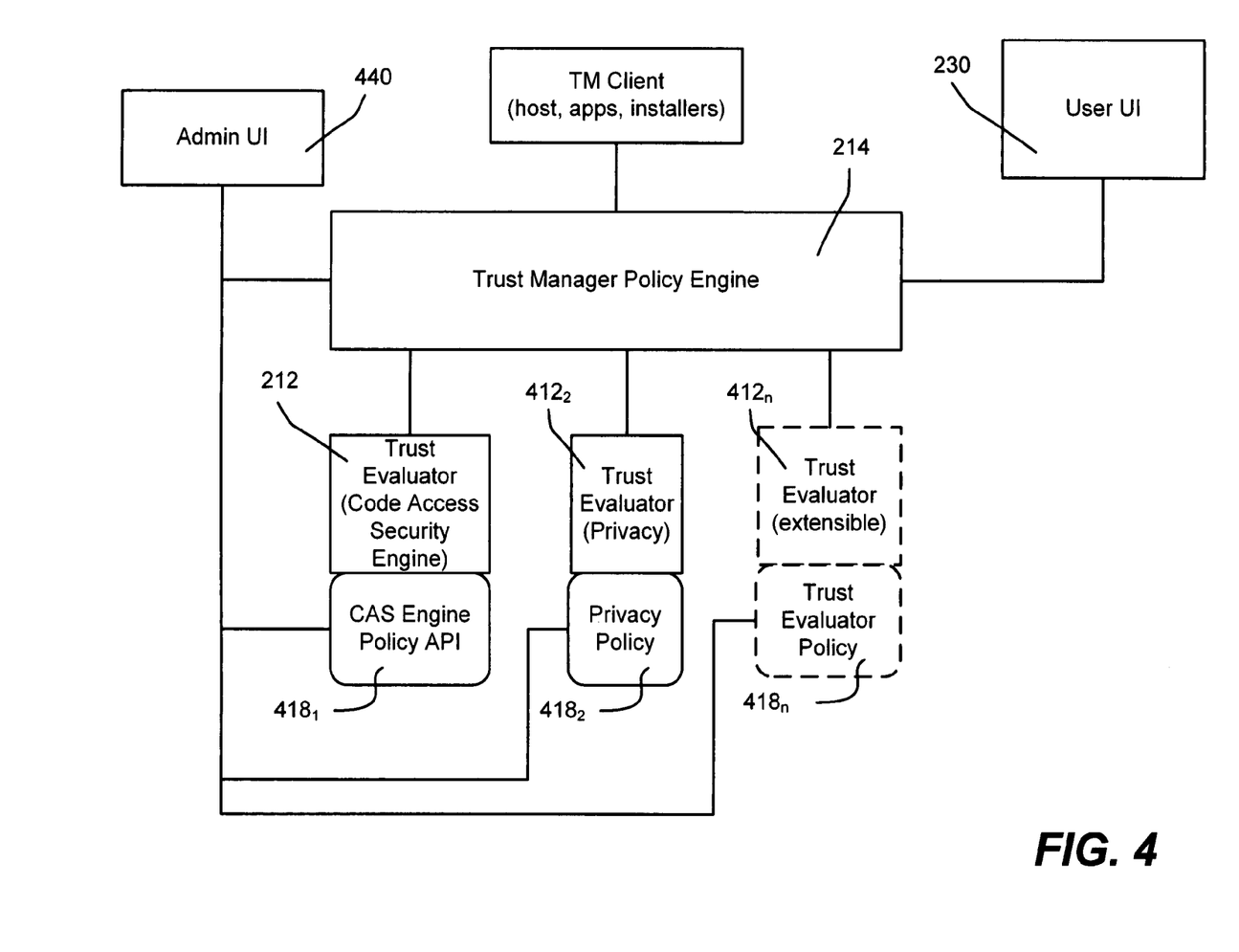
FIG. 4 is a block diagram generally representing a trust manager architecture used to evaluate programs for trustworthiness, in accordance with various aspects of the present invention.

As represented in FIG. 4, the trust manager 214 comprises a policy engine for making per-application decisions by considering an extensible set of trust evaluators including the code access security component 212 and other trust evaluators $416_2$-$416_n$, each of which having corresponding policy data $418_1$-$418_n$ as set by an administrator via user interface 440. The trust evaluator 212 and $416_2$-$416_n$ may be consulted as needed by the trust manager policy engine 214 for input (e.g., a score or other value) towards a per-application decision. The decision is generally about how to configure policy and resultantly enforce policy about an application; examples include "run/no run", "run as admin," "configure firewall policy a certain way for this application," and so forth. For example, one set of policy data $418_1$ may be for evaluating an application program's security-related information, another set of policy data $418_2$ for evaluating what an application program can do with respect to privacy policy, and so on. In the architecture of FIGS. 2 and 4, the code access security trust evaluator 212 inspects permissions requested by an application and provides a score. The policy may involve end user input to resolve what action to take, and thus the trust manager policy engine 214 is coupled to (or equivalently includes) the user interface 230, sometimes referred to as a consent UI that represents the consumer view of the trust manager.

Trust, security and policy are further described in U.S. patent application Ser. No. 09/598,814 entitled "Evaluating Initially Untrusted Evidence in an Evidence-Based Security Policy Manager, Ser. No. 10/705,756 entitled "Evidence Based Application Security" and Ser. No. 10/440,518 entitled "Mechanism for Evaluating Security." Each of the applications referenced herein are assigned to the same assignee of the present invention and hereby incorporated by reference.

In accordance with an aspect of the present invention, category-related information is used to determine whether an application program is trustworthy, and therefore which policy data to apply to the application program. Categories are capability descriptions, wherein a capability corresponds to a set of functionality provided by a component. Typically a capability involves a contract or interface between a host and the hosted component; the details of the actual contract are (usually) not formally captured as part of the category definition.

In one implementation, the application provides the category-related data in the form of a tag. For example, as represented in FIG. 3, one such tag may be "category: ScreenSaver" or some other suitable text or value corresponding to a class of application programs. In general, and as represented in FIG. 2, the set of permissions/privileges for each category that are truly needed in order for that class of application programs to properly operate (yet do so in a manner that cannot cause instability or act maliciously) are established in advance by a trusted entity, such as the developer of the operating system, and maintained in a category store 240.

When an application program provides its category-related information and its security-related information 209 in the manifest 206, the trust manager accesses the category store 240 via a category system 242 (in another implementation, the trust manager could access the store directly), and obtains the previously established set of permissions/privileges for the particular category that is identified in the manifest tag 210. Note that the architecture may limit the manifest to specifying only one category, e.g., by ignoring more than one, by taking the least privileged one, or by some other mechanism.

In accordance with another aspect of the present invention, the established set of permissions/privileges are evaluated against those set forth in the application program manifest. In order to be considered trustworthy, the application program's set needs to not request more than provided in the established set. If trustworthy, the trust manager 214 will apply one policy, otherwise the trust manager 214 will apply another.

In one implementation, the permission set for a trusted screen saver, (the BasicFullScreenVisualizationPermissionSet) comprises:

```
<PermissionSet
class="System.Security.BasicFullScreenVisualizationPermissionSet"
version="1"
ID="BasicScreenSaverPermissionSet">
<IPermission class=
"System.Security.Permissions.FileDialogPermission"
        version="1" Unrestricted="true" />
    <IPermission
class="System.Security.Permissions.SecurityPermission" version="1"
    Flags="Execution" />
<!--Temporary IsolatedStorage used until .config/wmi support up -->
    <IPermission
class="System.Security.Permissions.IsolatedStorageFilePermission"
    version="1" Allowed="DomainIsolationByUser" UserQuota=
    "5242880"
    />
    <!-- UnrestrictedFullScreen added to base SEE UIPermission's -->
    <IPermission class="System.Security.Permissions.UIPermission"
version="1"
    Window="UnrestrictedFullScreen" Clipboard="OwnClipboard" />
</PermissionSet>
```

By way of example, consider a screen saver application program that designates itself as being of a screen saver category in the manifest tag 210. It has been previously established that the only permission a screen saver needs is a limited, basic set including full screen permission, and this information is stored in the category store 240. When the trust manager 214 is deciding on what policy to apply when a user has requested installation of a screen saver, the decision is made based on the established set of permissions/privileges for a screen saver (the basic safe full screen permission set described above) against the set 209 within the application program manifest 206. If what that the application program has specified does not exceed the basic safe full screen permission set, then the code is safe because no other permissions will be granted and the trust manager 214 considers the screen saver code trustworthy and applies one policy regarding its installation. Conversely, if the application program is requesting any other permission/privilege outside of the safe execution environment, then the code may not be safe, the trust manager 214 considers the screen saver code not trustworthy and applies another policy regarding its installation.

Figure 5:
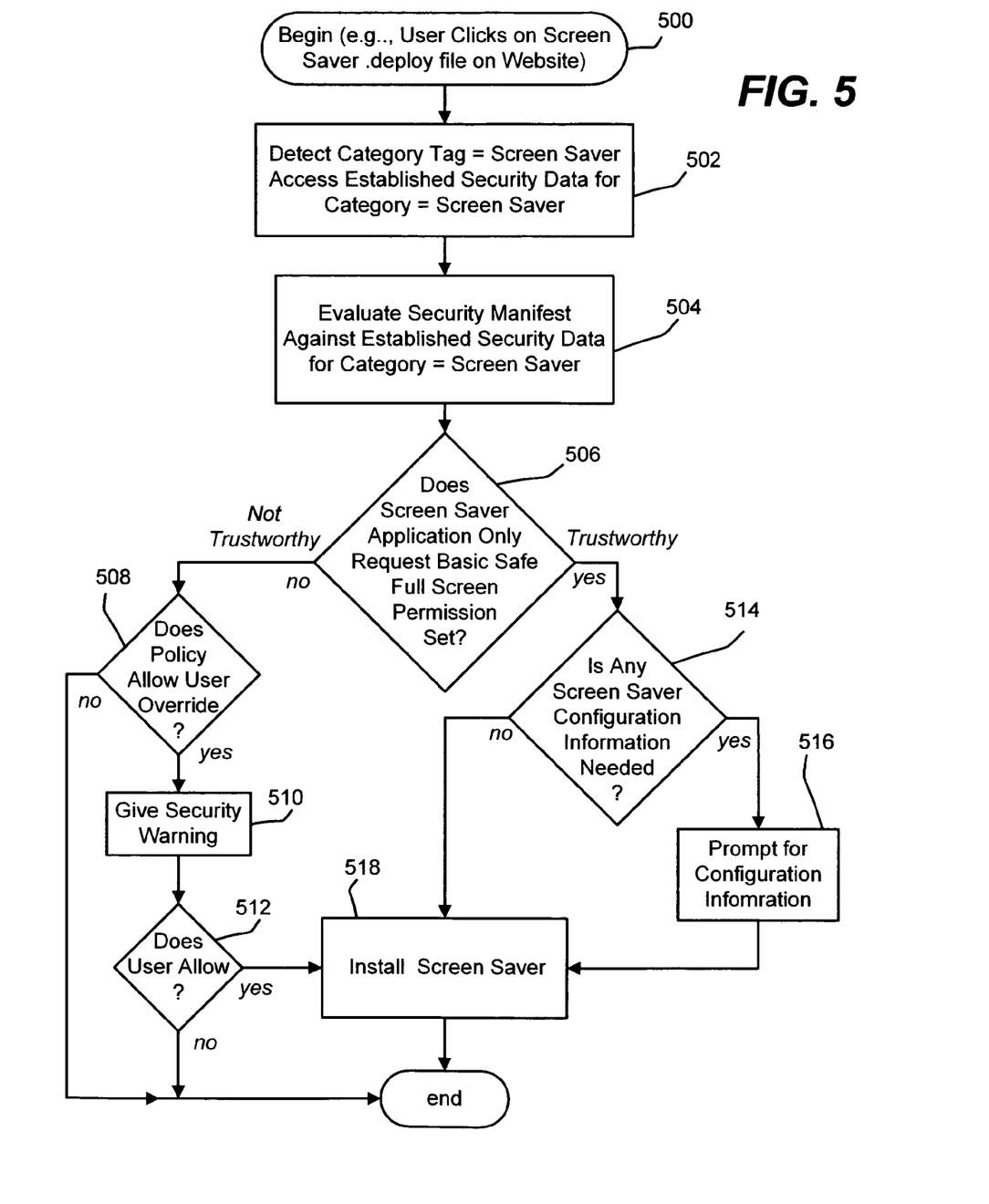
FIG. 5 is a flow diagram generally representing the evaluation of an example screen saver program for trustworthiness, in accordance with various aspects of the present invention.

FIG. 5 shows how this may apply to a screen saver application program, although it can be readily appreciated that FIG. 5 may be generalized to other categories of application programs. In FIG. 5, the process begins when a user requests installation of a screen saver program, such as by clicking on an installation icon on a website. Step 502 represents detecting the category tag in the program manifest, and accessing the previously established security-related data to which the program needs to correspond in order to be considered trustworthy.

Step 504 represents evaluating the application-provided security information in its manifest with the established security-related data that was accessed. If the sets do not correspond, as represented by step 506 where the only permission a trusted screen saver can have is one that matches (or is a subset of) the basic safe full screen permission set, the screen saver is not considered trustworthy. If policy (e.g., set by an administrator) allows the user to install it anyway, as represented by step 508, the user is warned (step 510) and prompted for an installation decision (evaluated at step 512). Otherwise the installation is prevented by step 508. If allowed by the administrator policy, the user may thus optionally install at step 518, but is warned of the consequences. Note that these steps are only a simplified example, and other policy data, such as whether the application is signed by a publisher known to be trusted, may also factor in the decision.

Returning to step 506, if the sets do correspond, as represented by step 506 branching to step 514 when a screen saver's manifest matches or is a subset of the basic safe full screen permission set, the screen saver is considered trustworthy. Step 514 then determines whether any configuration information for that screen saver is needed, or for example, whether default configuration information is to be applied without involving the user. If needed, the user is prompted via step 516 to obtain the information. In any event, the screen saver is installed at step 518. Note that although not shown in FIG. 5, it may be desirable to have an option for a user to cancel installation at least one additional time before installing.

In an alternative implementation (to that above, where the security-related information of the application is compared to known information based on its category), an application program that declares a category is automatically assigned the pre-established security-related information for that category. By way of example, using the screen saver as the application program, a program may designate itself as a screen saver, and, regardless of what permissions and/or privileges it requests, (if any), the basic safe full screen permission set will be given to the program but no other permission or privilege. In other words, rather than compare, the trust manager will simply override any manifest-specified permissions and privileges and instead build the trust object based one the permission(s) and privilege(s) retrieved from the category store. In the screen saver example, the application will receive the basic safe full screen permission set, regardless of what its manifest requests. Note that in such an implementation, a program is bound by its specified category, and thus a category such as "expanded screen saver" or the like may be required for screen saver application programs that need other permissions/privileges, in which case they will also specify their needed permissions and privileges and may be (subject to policy) installed as a screensaver, but not one that is deemed trustworthy.

Returning to FIG. 3, there is shown a general example of how a screen saver application program 302 may be created as trustworthy in accordance with various aspects of the present invention. A screen saver generation program 382 such as a bitmap editor, digital photography program or the like provides the image and incorporates and/or invokes code that converts the image to a screen saver program. As can be readily appreciated, development of a simple program such as a screen saver can be highly automated.

Further, as described above, a category implementer declares its capabilities (e.g., category and permission set) in the application manifest, which may comprise an XML file constructed via a XAML authoring tool 384 or the like. Manifests are generated during the development/build process from a variety of sources, including custom attributes in source files. A category name is equivalent to a CLR type name, and comprises a strong assembly identity (e.g., at least "name", "version" and "publicKeyToken") and a locally unique typeName that is scoped by the assembly name. This allows categories to be associated with an actual assembly (for additional meta-data like category definition or even typical operations that are associated with the category), and enables an assembly to define more than one category. A category may have sub-categories, but need not; a screen saver does not.

A screen saver implementer may tag their component with the category:

```
<assembly xmlns="uri:schemas-microsoft-com:asm.v1">
    <assemblyIdentity="Microsoft.example.pgm,version=6.1.0.0"/>
    ...
    <memberships>
        <categoryMembership typeName="SideBarTile"
name="Microsoft.Windows.Explorer" version="6.0.0.0"
publicKeyToken=6595b64144ccf1df">
            <ScreenSaverData name="My Screen Saver"/>
        </categoryMembership>
    </memberships>
    ...
</assembly>
```

Note that any application program that would like full screen permission and would like to be considered safe need only limit its capabilities to those held by the basic safe screen saver permission set that was set forth above.

The following sets forth an outline of a ScreenSaverApplication class:

```
public sealed class ScreenSaverApplication :
NavigationApplication {
    public string ConfigurationPage {set;}
    /*   ScreenSaverApplication
     *   ***********************
     *   Initializes instance.
     */
    public ScreenSaverApplication( );
    /*   OnStartingUp
     *   ****
     *   Determines whether a screen saver is to be run
     *   in configuration, active or password setting mode.
     *
     *   In configuration mode, the StartUpPage will be set to
the
     *   ConfigurationPage attribute.
     *   In active mode, the mouse cursor is set to be
     *   invisible and the window is set to full screen.
     *
     *   It will also set up handlers for all mouse and keyboard
events that
     *   call the associated event handler functions in this
class.
     *
     *   The application must be set to always have focus and be
on top.
     */
    public override void
OnStartingUp(StartingUpCancelEventArgs);
    /* PointerClickEvents
     * PointerPositionEvents
     * PointerWheelEvents
     * KeyboardEvents
     * ***********************
```

-continued

```
     * These event handlers call ShutDown( ).   In order for
clients to
     * override and implement their own functionality, they can
remove
     * these handlers from the window and add their own.
     */
    public virtual void MouseClickEvents (DynamicComponent dc,
        PointerButtonEventArgs args);
    public virtual void MousePositionEvents (DynamicComponent
dc,
        PointerButtonEventArgs args);
    public virtual void MouseWheelEvents (DynamicComponent dc,
        PointerButtonEventArgs args);
    public virtual void KeyboardEvents (Element e, KeyEventArgs
args);
}
```

| Attribute | Explanation |
|---|---|
| Name | Will hold the name of the screen saver, which will be displayed in the Shell Screen Saver Dialog Picker |
| Description | Describes the screen saver. May be used in TM. |
| canConfig | <true, false> values. Indicates whether the screen saver contains configuration abilities. |

The user provides a configuration xaml file, which supplies the markup for any configuration settings the program might require for the end user. It should write to a screensaver.config file that is designated in the .deploy file.

Although the present invention has been primarily described with reference to a screen saver, there are numerous other programs that may benefit from a trustworthy status that verifies them as safe because of only needing the safe permission set relative to their functionality. For example, spell checkers, media players and so forth may be used. The following include other permissions that an application program may specify, which may be compared with a previously established set that determines trustworthiness for a given category of application program:

| Class | Description |
|---|---|
| CodeAccessSecurityAttribute | Specifies the base attribute class for code access security. |
| EnvironmentPermission | Controls access to system and user environment variables. This class cannot be inherited. |
| EnvironmentPermissionAttribute | Allows security actions for EnvironmentPermission to be applied to code using declarative security. This class cannot be inherited. |
| FileDialogPermission | Controls the ability to access files or folders through a file dialog. This class cannot be inherited. |
| FileDialogPermissionAttribute | Allows security actions for FileDialogPermission to be applied to code using declarative security. This class cannot be inherited. |
| FileIOPermission | Controls the ability to access files and folders. This class cannot be inherited. |
| FileIOPermissionAttribute | Allows security actions for FileIOPermission to be applied to code using declarative security. This class cannot be inherited. |
| IsolatedStorageFilePermission | Specifies the allowed usage of a private virtual file system. This class cannot be inherited. |
| IsolatedStorageFilePermissionAttribute | Allows security actions for IsolatedStorageFilePermission to be applied to code using declarative security. This class cannot be inherited. |
| IsolatedStoragePermission | Represents access to generic isolated storage capabilities. |
| IsolatedStoragePermissionAttribute | Allows security actions for IsolatedStoragePermission to be applied to code using declarative security. |
| PermissionSetAttribute | Allows security actions for a PermissionSet to be applied to code using declarative security. This class cannot be inherited. |
| PrincipalPermission | Allows checks against the active principal (see IPrincipal) using the language constructs defined for both declarative and imperative security actions. This class cannot be inherited. |
| PrincipalPermissionAttribute | Allows security actions for PrincipalPermission to be applied to code using declarative security. This class cannot be inherited. |
| PublisherIdentityPermission | Represents the identity of a software publisher. This class cannot be inherited. |
| PublisherIdentityPermissionAttribute | Allows security actions for PublisherIdentityPermission to be applied to code using declarative security. This class cannot be inherited. |
| ReflectionPermission | Controls access to metadata through the System.Reflection APIs. This class cannot be inherited. |
| ReflectionPermissionAttribute | Allows security actions for ReflectionPermission to be applied to code using declarative security. This class cannot be inherited. |
| RegistryPermission | Controls the ability to access registry variables. This class cannot be inherited. |
| RegistryPermissionAttribute | Allows security actions for RegistryPermission to be applied to code using declarative security. This class cannot be inherited. |
| ResourcePermissionBase | Allows control of code access security permissions. |
| ResourcePermissionBaseEntry | Defines the smallest unit of a code access security permission set. |
| SecurityAttribute | Specifies the base attribute class for declarative security from which CodeAccessSecurityAttribute is derived. |
| SecurityPermission | Describes a set of security permissions applied to code. This class cannot be |

-continued

| Class | Description |
| --- | --- |
| SecurityPermissionAttribute | inherited.<br>Allows security actions for SecurityPermission to be applied to code using declarative security. This class cannot be inherited. |
| SiteIdentityPermission | Defines the identity permission for the Web site from which the code originates. This class cannot be inherited. |
| SiteIdentityPermissionAttribute | Allows security actions for SiteIdentityPermission to be applied to code using declarative security. This class cannot be inherited. |
| StrongNameIdentityPermission | Defines the identity permission for strong names. This class cannot be inherited. |
| StrongNameIdentityPermissionAttribute | Allows security actions for StrongNameIdentityPermission to be applied to code using declarative security. This class cannot be inherited. |
| StrongNamePublicKeyBlob | Represents the public key information (called a blob) for a strong name. This class cannot be inherited. |
| UIPermission | Controls the permissions related to user interfaces and the clipboard. This class cannot be inherited. |
| UIPermissionAttribute | Allows security actions for UIPermission to be applied to code using declarative security. This class cannot be inherited. |
| UrlIdentityPermission | Defines the identity permission for the URL from which the code originates. This class cannot be inherited. |
| UrlIdentityPermissionAttribute | Allows security actions for UrlIdentityPermission to be applied to code using declarative security. This class cannot be inherited. |
| ZoneIdentityPermission | Defines the identity permission for the zone from which the code originates. This class cannot be inherited. |
| ZoneIdentityPermissionAttribute | Allows security actions for ZoneIdentityPermission to be applied to code using declarative security. This class cannot be inherited. |

As can be seen from the foregoing detailed description, there is provided a method and system by which an application program is controlled based on its trustworthiness with respect to the permissions that the application program needs relative to the particular category of application program. Those programs that ask for only the permission or permissions than are needed are deemed trustworthy, whereby different policy can be applied to handle their installation.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for a computer system and a user of the computer system to ensure trustworthiness of computer-executable code that is available for download on an interconnected network, thereby avoiding installation and execution of computer-executable code that may be dangerous to the computer system, the method comprising:

receiving from an entity, which is connected to the computing system through the interconnected network and which is making a computer-executable code application available, security-related information comprising a descriptive data structure which comprises a specific set of permissions that the application requests from the computing system in order to operate and category-related information comprising a category that the application corresponds to which is indicative of the application's functionality and capability;

accessing established security-related data comprising an established permission set for the category that the application corresponds to, the established permission set reflecting the permissions that are grantable to applications within the category;

comparing the specific set of permissions that the application requests with the established permission set in order to determine if the specific set of permissions that the application requests matches or is a subset of the established permission set;

if the specific set of permissions that the application requests matches or is a subset of the established permission set, considering the application as trustworthy, such that the application is considered as being trustworthy when the application does not request any permission or privilege in the specific set of permissions that the application requests that is not contained in the established permission set corresponding to the category of the application; and if the specific set of permissions that the application requests does not match or is not a subset of the established permission set, considering the application as not trustworthy.

2. The method of claim 1 wherein the application is considered trustworthy, and further comprising, applying a first policy with respect to installing the application.

3. The method of claim 2 wherein applying the first policy comprises determining whether information is needed from a user of the computer system, and if not, installing the application.

4. The method of claim 3 wherein information is needed from the user of the computer system, and further comprising, prompting the user for the information before installing the application.

5. The method of claim 1 wherein the application is considered not trustworthy, and further comprising, applying a policy to determine whether to allow the application to be installed.

6. The method of claim 5 wherein applying the policy comprises warning the user of the computer system that the application is not a trusted application, and waiting for user input that determines whether to allow the application to be installed.

7. The method of claim 1 wherein the category-related information identifies the application as a screen saver, wherein accessing the established security-related data comprises reading a first data set of at least one permission or privilege that screen saver applications are allowed to have.

8. The method of claim 7 wherein the first data set includes an entry corresponding to a full screen permission.

9. The method of claim 1 wherein receiving the security-related information and the category-related information comprises receiving at least one manifest associated with an application program.

10. One or more computer storage media having computer-executable instructions which when executed perform the method of claim 1.

11. The one or more computer storage media of claim 10, further comprising:
controlling installation of the application program based on the category-related information.

12. The one or more computer storage media of claim 11 further comprising, applying a policy to control installation based on whether the application is found to be trustworthy.

13. The one or more computer storage media of claim 12 wherein the application is found to be trustworthy and wherein applying the policy to control installation comprises installing the application without providing a security warning.

14. The one or more computer storage media of claim 13 further comprising receiving configuration information from the user of the computer system prior to installing the application.

15. The one or more computer storage media of claim 12, wherein the application is found to be not trustworthy, and wherein applying the policy to control installation comprises preventing installation of the application.

16. The one or more computer storage media of claim 12 wherein the application is found to be not trustworthy, and wherein applying the policy to control installation comprises requiring user input to determine whether to allow or prevent installation of the application.

17. The one or more computer storage media of claim 11 wherein the category-related information identifies the application as a screen saver, and wherein controlling installation of the application based on the category-related information comprises applying an installation policy based on security-related information associated with screen saver application programs.

18. The method of claim 1, further comprising limiting the program, once downloaded and when executed, to permissions within the established permission set that corresponds to the specified category of the application, irrespective of the permissions that the application may have requested in the security-related information.

19. The method of claim 1, wherein the category that the application corresponds to is an application type.

20. In a computing environment, a method comprising:
receiving security-related information and category-related information corresponding to an application program, wherein the category-related information identifies the application program as a screen saver,
accessing established security-related data based on the category-related information, wherein accessing the established security-related data comprises reading a first data set of at least one permission or privilege that screen saver applications are allowed to have, and
evaluating whether the received security-related information corresponds to the established security-related data, and if so, considering the application program as trustworthy, wherein evaluating whether the received security-related information corresponds to the established security-related data comprises comparing the first data set to a second data set of at least one permission or privilege that screen saver application program is requesting, such that the application program is considered as being trustworthy when the second data set does not request any permission or privilege that is not contained in the first data set and wherein the first data set includes an entry corresponding to a full screen permission.

* * * * *